(12) United States Patent
Cohen et al.

(10) Patent No.: US 12,373,935 B1
(45) Date of Patent: Jul. 29, 2025

(54) GENERATING INTERACTIVE VEHICLE INSPECTION INTERFACES USING MULTI-MODEL ARTIFICIAL INTELLIGENCE AND ANCHOR-BASED SPATIAL TRACKING

(71) Applicant: UVeye Ltd., Tel Aviv (IL)

(72) Inventors: Idan Cohen, Tel Aviv (IL); Ilya Grinshpoun, Ramat Gan (IL); Itai Orr, Or Akiva (IL); Amir Hever, Tenafly, NJ (US)

(73) Assignee: UVeye Ltd., Tel Aviv (IL)

( * ) Notice: Subject to any disclaimer, the term of this patent is extended or adjusted under 35 U.S.C. 154(b) by 0 days.

(21) Appl. No.: 19/032,581

(22) Filed: Jan. 21, 2025

(51) Int. Cl.
| | |
|---|---|
| *G06T 7/00* | (2017.01) |
| *G06T 3/4038* | (2024.01) |
| *G06T 7/10* | (2017.01) |
| *G06V 10/10* | (2022.01) |
| *G06V 10/26* | (2022.01) |
| *G06V 10/82* | (2022.01) |

(52) U.S. Cl.
CPC .......... *G06T 7/0004* (2013.01); *G06T 3/4038* (2013.01); *G06T 7/10* (2017.01); *G06V 10/16* (2022.01); *G06V 10/26* (2022.01); *G06V 10/82* (2022.01); *G06T 2200/24* (2013.01); *G06T 2207/20081* (2013.01); *G06T 2207/20084* (2013.01); *G06T 2207/30204* (2013.01); *G06T 2207/30252* (2013.01)

(58) Field of Classification Search
CPC ....... G06T 7/0004; G06T 3/4038; G06T 7/10; G06T 2200/24; G06T 2207/20081; G06T 2207/20084; G06T 2207/30204; G06T 2207/30252; G06V 10/16; G06V 10/26; G06V 10/82
See application file for complete search history.

(56) References Cited

U.S. PATENT DOCUMENTS

| | | | |
|---|---|---|---|
| 12,140,501 B1 * | 11/2024 | Hever | G01N 21/8806 |
| 12,249,061 B1 * | 3/2025 | Segal | G06T 7/30 |
| 2023/0342937 A1 * | 10/2023 | Hever | G06V 10/255 |
| 2024/0362692 A1 * | 10/2024 | Williams | G06Q 30/0631 |
| 2024/0404041 A1 * | 12/2024 | Hever | G06T 7/12 |
| 2024/0419907 A1 * | 12/2024 | Laprise | G01C 21/34 |
| 2025/0022274 A1 * | 1/2025 | Malalur | G06V 10/82 |
| 2025/0106399 A1 * | 3/2025 | Zhou | H04N 19/124 |
| 2025/0106577 A1 * | 3/2025 | Bernsee | H04S 7/30 |

* cited by examiner

*Primary Examiner* — Bobbak Safaipour

(57) ABSTRACT

A system and method for generating an interactive user interface for inspection visualization. The system includes multiple imaging devices positioned along a inspection passage and at least one processor that executes instructions to: obtain multiple sets of images of vehicle surface segments captured during relative movement between the vehicle and imaging devices; stitch the images into a dataset record mapping vehicle parts and surface anomalies; transform the image data into a moving visual media object using a first generative AI model; compute a mapping record between segmented vehicle parts and target frame areas; and transform the mapping record and visual media object into an interactive interface using a second generative AI model. The interface displays user-selectable markers synchronized with media playback, indicating anomaly locations from multiple viewing angles, and performs data retrieval and display actions based on user selection of anomalies.

20 Claims, 6 Drawing Sheets

GENERATING INTERACTIVE VEHICLE INSPECTION INTERFACES USING MULTI-MODEL ARTIFICIAL INTELLIGENCE AND ANCHOR-BASED SPATIAL TRACKING

FIELD AND BACKGROUND OF THE INVENTION

The present invention relates generally to vehicle inspection systems and methods, and more particularly to automated systems and methods for generating interactive user interfaces that display vehicle damage information using artificial intelligence models and multi-camera imaging systems.

Vehicle inspection is a critical process in many industries, including automotive sales, insurance claims processing, and fleet management. Traditional vehicle inspection methods typically rely on manual visual inspections, which can be time-consuming, subjective, and prone to human error. These manual processes often fail to capture comprehensive documentation of vehicle condition and may miss subtle damages or defects that are only visible from certain angles.

Recent advances in computer vision and artificial intelligence have enabled more sophisticated approaches to vehicle inspection. However, existing automated systems often struggle with creating coherent and accurate representations of vehicle damage across multiple camera views. Additionally, current solutions typically provide static images or basic video recordings that do not allow for interactive exploration of detected anomalies.

SUMMARY OF THE INVENTION

According to some embodiments of the present invention there is provided a system for generating an interactive vehicle inspection interface, comprising a set of multiple imaging devices positioned along an inspection passage, at least one processor, and memory storing instructions that, when executed, obtain multiple sets of images of vehicle surface segments captured at different time points during relative movement between the vehicle and imaging devices, stitch these images into a dataset record mapping vehicle parts and anomalies, transform the image data into a moving visual media object showing multiple views using a first AI model, compute a mapping record between segmented parts and target frame areas, and transform this data into an interactive user interface using a second AI model that displays synchronized user-selectable markers indicating anomaly locations, where the interface performs data retrieval and display actions based on user selections.

Optionally, the system sequentially presents multiple frames of the moving visual media object to show different views of the vehicle through the interactive user interface.

Optionally, the system analyzes the images using a car parts segmentation model to generate segmentations and performs temporal tracking of these segmentations across multiple frames.

Optionally, the system identifies and tracks anchor parts (wheels, door handles, headlights, taillights) using the car parts segmentation model across multiple frames.

Optionally, the system uses the tracked anchor parts to align multiple camera views during dataset record stitching.

Optionally, the system uses the tracked anchor parts to register damage locations and synchronize damage marker positions during playback.

Optionally, the system generates a 360-degree walkaround video using the first AI model.

Optionally, the first AI model comprises one or more of: 3D reconstruction model, rendering model, neural radiance field model, and Gaussian splatting model.

Optionally, the interface includes a main multiple degrees view, damage preview panel showing close-ups and details, body part panel for accessing specific components, and anchor point bar for navigation.

Optionally, the interface displays damage markers that rotate synchronously with vehicle movement.

Optionally, the interface rotates the vehicle to optimal viewing angles for specific damages upon selection.

Optionally, the system computes the mapping record by registering the dataset to a visual representation coordinate system and mapping features to corresponding frame locations.

Optionally, the system implements automated motion, maintains synchronized visual indicators, and generates graphical links between interface elements based on user interaction.

Optionally, the system triggers motion to optimal viewpoints, maintains marker positioning during transitions, and synchronizes visual connections.

Optionally, the system maintains a feature registry, generates dynamic inspection views, and creates visual connections with spatial accuracy during transitions.

Optionally, the system implements a navigation system with predefined viewpoints, mapping table, and motion control for smooth transitions while maintaining spatial coherence.

Optionally, the first AI model includes a neural network trained for NeRF generation and viewpoint rendering with coordinate and color networks.

Optionally, the second AI model includes a neural network trained for synchronized UI elements and marker positioning using anchor part tracking.

Optionally, the first AI model implements Gaussian splatting with 3D primitives optimization and temporal consistency.

Optionally, the system implements real-time synchronization through position buffering, trajectory prediction, interpolation, validation, and visibility adjustment.

Optionally, the system implements a damage severity classification model analyzing anomalies and generating repair estimates.

Optionally, the first AI model implements a multi-stage pipeline for 3D reconstruction, refinement, texturing, and view-dependent rendering.

Optionally, the system implements marker synchronization through a spatial graph structure linking anchor parts, anomalies, and rendering parameters.

Optionally, the second AI model implements an attention mechanism for rotation optimization and interface element consistency.

According to some embodiments of the present invention there is provided a method of generating an interactive vehicle inspection interface comprising: obtaining multiple sets of images from imaging devices positioned along a stationary inspection passage, capturing images during vehicle movement, stitching these into a dataset record mapping vehicle parts and anomalies, transforming the data into a moving visual media object showing multiple views using a first AI model, computing a mapping record between segmented parts and target frames, transforming this into an interactive interface with synchronized user-selectable markers using a second AI model, controlling presentation based on user selection of markers, and performing data retrieval and display actions based on user selections.

Optionally, the method includes sequentially presenting multiple frames of the moving visual media object to show different vehicle views through the interactive user interface.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

The following detailed description and annexed drawings set forth particular embodiments that demonstrate these improvements and advantages through specific implementations and architectural approaches.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 5:
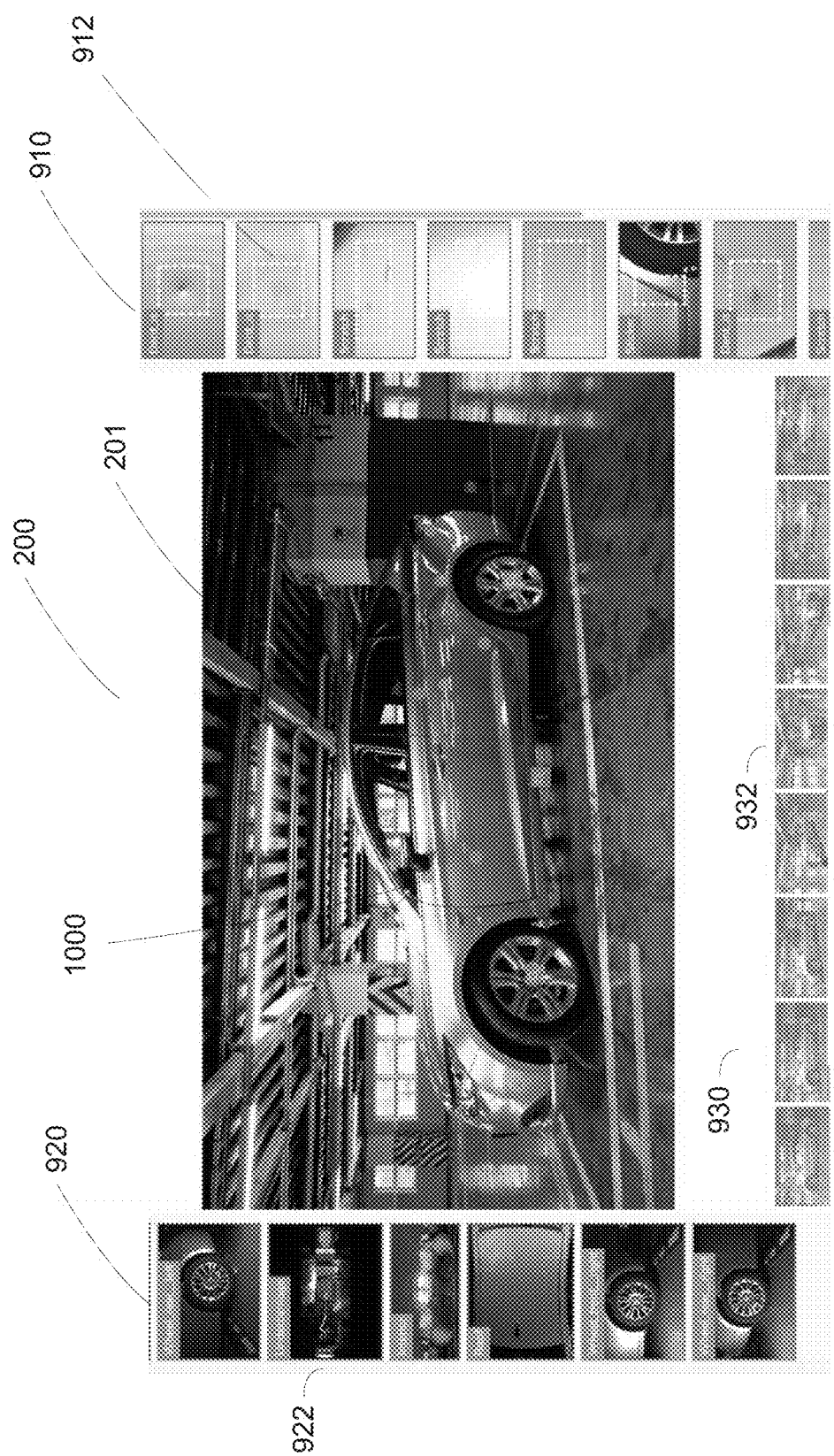
Figure 6:
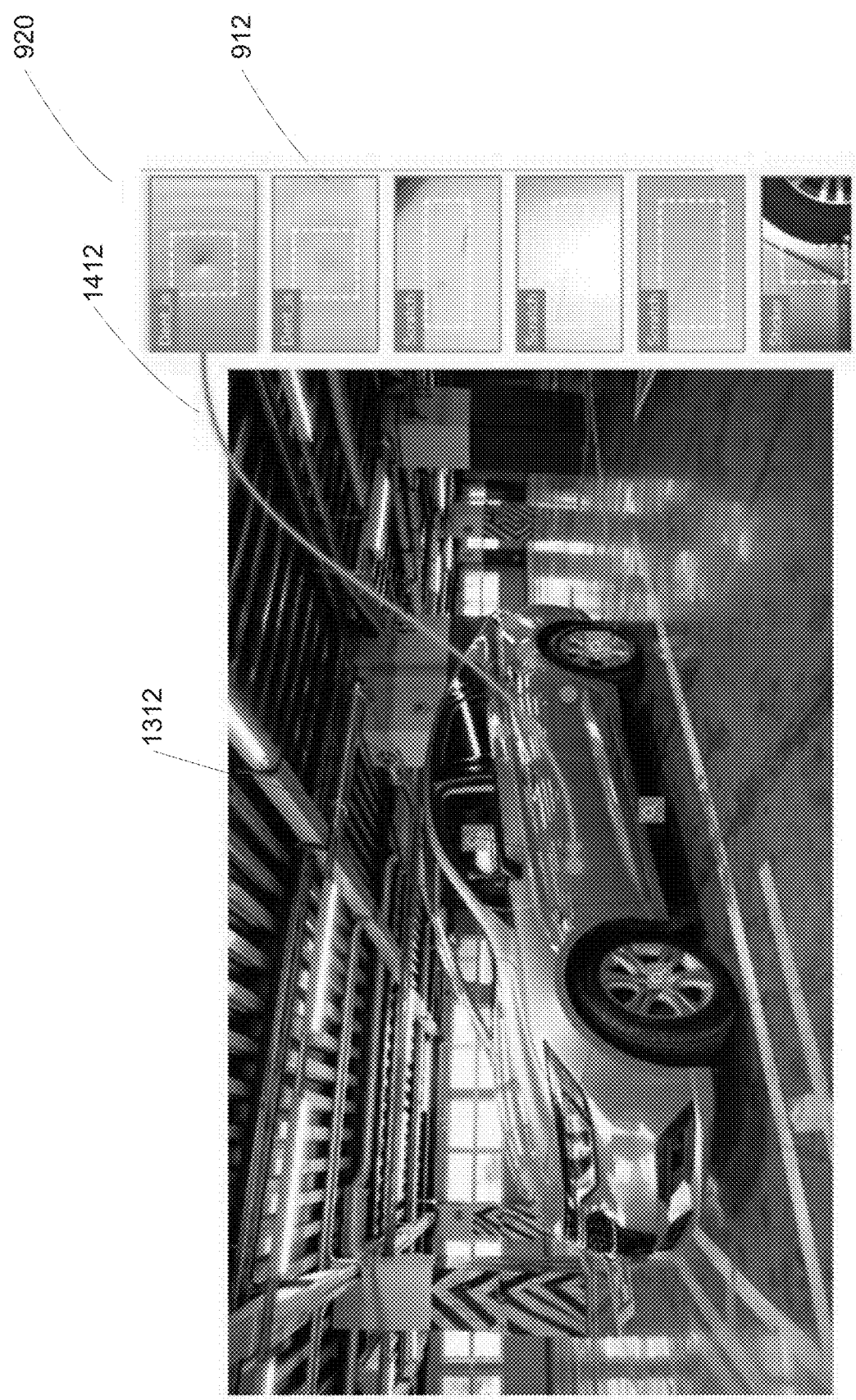
Figure 7:
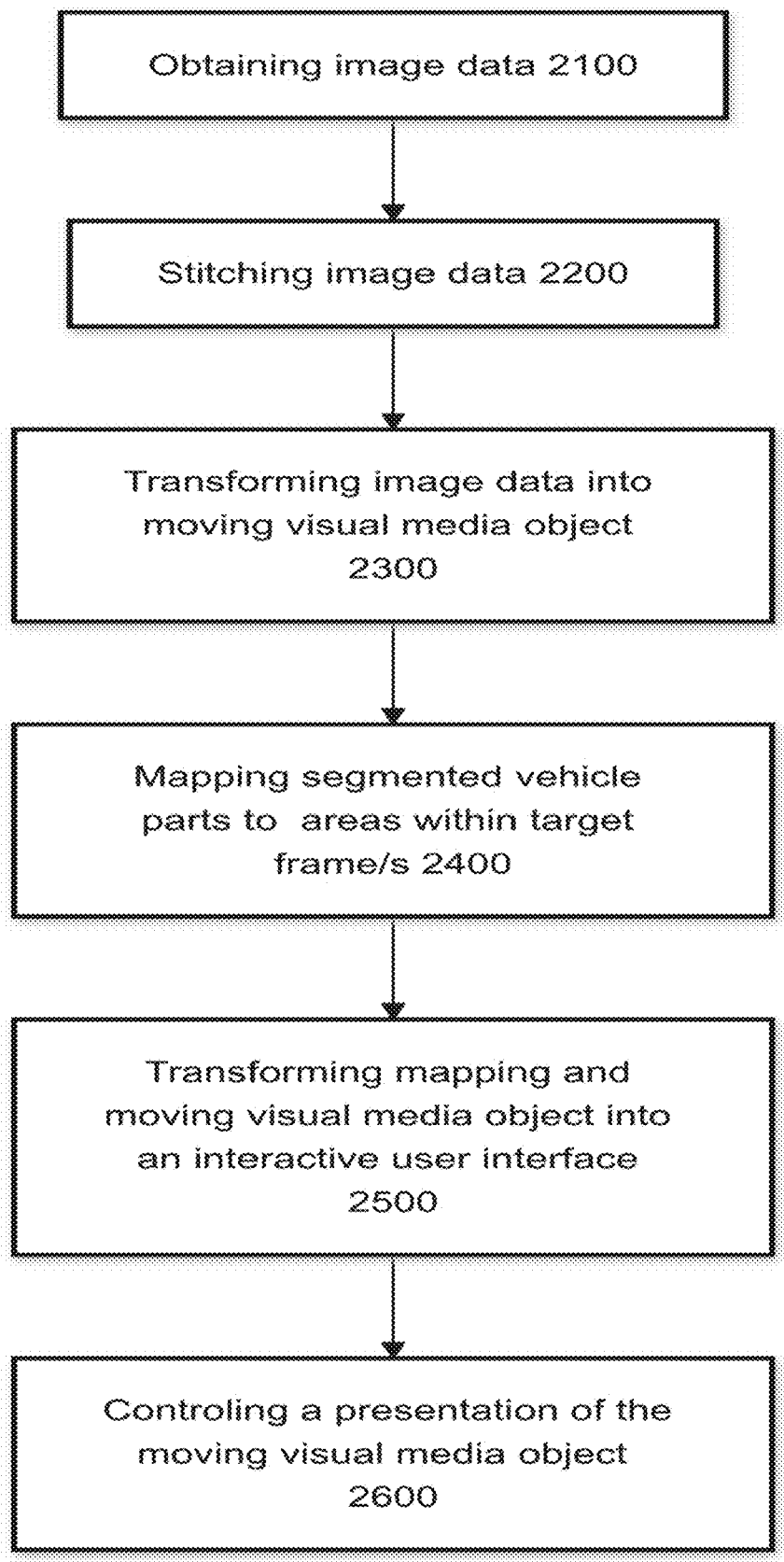

FIG. 5 a screenshot of the interactive user interface showing a vehicle in different angles within a main multiple degrees view window that automatically rotates the vehicle visualization, according to some embodiments of the present invention;

FIG. 6 is a screenshot of the interactive user interface showing the main multiple degrees view window with damage markers and connecting lines between markers and damage previews, according to some embodiments of the present invention; and FIG. 7 is a flowchart illustrating the method for generating an interactive user interface for vehicle inspection visualization, showing the sequence from image acquisition through transformation and interface generation, according to some embodiments of the present invention.

To enable a complete understanding of the invention's technical implementation and advantages, the following detailed description references the aforementioned drawings while providing comprehensive implementation details of preferred embodiments.

DESCRIPTION OF SPECIFIC EMBODIMENTS OF THE INVENTION

The present invention relates generally to vehicle inspection systems and methods, and more particularly to automated systems and methods for generating interactive user interfaces that display vehicle damage information using artificial intelligence models and multi-camera imaging systems.

The challenge of effectively communicating vehicle inspection results to end users remains significant. Traditional inspection reports often consist of disconnected photographs and written descriptions that make it difficult for users to understand the spatial relationship between different damages or to visualize the complete condition of the vehicle. Furthermore, existing systems typically lack the ability to present inspection results in an intuitive, interactive format that allows users to examine damages from multiple angles and perspectives.

Current vehicle inspection technologies also face technical challenges in maintaining consistent tracking of vehicle parts and damage locations across multiple camera views and frames. The lack of robust spatial and temporal tracking capabilities can lead to inconsistent or inaccurate damage documentation. Additionally, existing solutions often struggle with creating seamless transitions between different viewing angles and maintaining accurate damage marker positioning during vehicle visualization.

The integration of multiple imaging devices in vehicle inspection systems presents further complications in terms of data stitching and coordination. Traditional approaches often fail to effectively combine information from multiple cameras into a cohesive and accurate representation of the vehicle's condition. This limitation can result in fragmented or incomplete inspection results that do not provide a comprehensive view of the vehicle's state. As used herein, 'stitching' refers to the process of combining multiple images or image segments captured at different time points and from different angles into a unified, coherent representation while maintaining spatial relationships and feature mapping.

There is thus a need for improved systems and methods that can automatically generate interactive and intuitive user interfaces for vehicle inspection results, while maintaining accurate tracking and visualization of vehicle damages across multiple viewing angles and perspectives.

Some embodiments of the present invention address these challenges by providing a system that combines advanced imaging technology, artificial intelligence, and interactive visualization techniques. At its core, the invention creates a seamless bridge between physical vehicle inspection and digital damage assessment through an intuitive user interface. The system employs multiple strategically positioned cameras to capture comprehensive vehicle imagery as the vehicle passes through a specialized inspection passage. This multi-angle capture approach ensures complete coverage of the vehicle's surface, leaving no blind spots or missed areas during the inspection process.

Some embodiments of the present invention use AI models to transform raw inspection data into an interactive, user-friendly visualization. The system's first AI model processes and stitches multiple images into a fluid, 360-degree visualization of the vehicle, while a second AI model generates an interactive interface that allows users to explore and understand detected damage in detail. The synchronized marker system maintains precise spatial relationships between identified damages and their locations on the vehicle, even as users rotate and examine the vehicle from different angles.

The benefits of this approach are manifold. For insurance adjusters, the system dramatically reduces the time needed to assess vehicle damage while improving accuracy and consistency. Fleet managers can maintain detailed vehicle condition records with unprecedented detail and accessibility. For automotive retailers, the system provides a transparent and comprehensive way to document and communicate vehicle condition to potential buyers. The interactive nature of the interface eliminates the confusion often associated with traditional static inspection reports, allowing users to naturally explore and understand the full extent of vehicle damage through an intuitive, dynamic visualization system.

Through this comprehensive approach, the invention transforms what has traditionally been a subjective, time-consuming process into an efficient, objective, and user-friendly experience. The system's ability to maintain accurate damage tracking across multiple viewing angles, combined with its interactive visualization capabilities, represents a significant advancement in vehicle inspection technology that benefits all stakeholders in the automotive industry.

Some embodiments of the present invention provide several technical solutions that overcome fundamental challenges in automated vehicle inspection systems. A key technical advancement lies in the system's novel approach to spatial registration and temporal synchronization across multiple imaging perspectives. Through the implementation of anchor-based tracking algorithms, the system maintains precise spatial relationships between detected anomalies and fixed reference points on the vehicle, solving the long-standing technical challenge of consistent damage localization across varying viewpoints. This anchor-based approach enables robust geometric transformation calculations that preserve spatial accuracy even during dynamic visualization transitions.

Some embodiments of the present invention describe a dual-model AI architecture represents another significant technical contribution. The first generative AI model employs sophisticated image processing techniques to transform discrete multi-angle captures into a coherent visual media object, implementing advanced stitching algorithms that maintain both spatial and temporal consistency. The second AI model introduces an innovative approach to user interface generation, creating synchronized marker systems that dynamically adjust to viewing angle changes while maintaining precise spatial relationships with the underlying vehicle geometry. This dual-model approach effectively decouples the visualization generation from interface manipulation, enabling more efficient processing and improved system scalability.

Furthermore, some embodiments of the present invention introduce a novel technical framework for damage registration and marker synchronization. The system implements a hierarchical data structure that maintains bidirectional mappings between the original inspection data and the interactive visualization space. This architecture enables real-time updates to marker positions during visualization playback while ensuring referential integrity between different data components. The system's implementation of quaternion-based rotation calculations and occlusion detection algorithms ensures accurate marker positioning and visibility management across all viewing angles, addressing critical technical challenges in interactive 3D visualization systems.

The technical innovations extend to the system's distributed processing architecture, which enables parallel execution of image processing, damage detection, and interface generation tasks. The network interface implementation facilitates efficient data distribution across processing units while maintaining system cohesion through standardized protocols. This architectural approach provides significant advantages in processing efficiency and system scalability, particularly when handling high-resolution imaging data from multiple capture devices.

In addition to the core architecture described above, alternative embodiments may implement variations in the processing pipeline while maintaining the fundamental principles of anchor-based tracking and synchronized visualization.

These technical advancements, individually and in combination, represent non-obvious solutions to long-standing challenges in automated vehicle inspection systems, providing clear differentiation from prior art while delivering measurable improvements in system performance and accuracy.

Having described various embodiments and implementations in detail, the following claims define the scope and essential characteristics of the invention.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
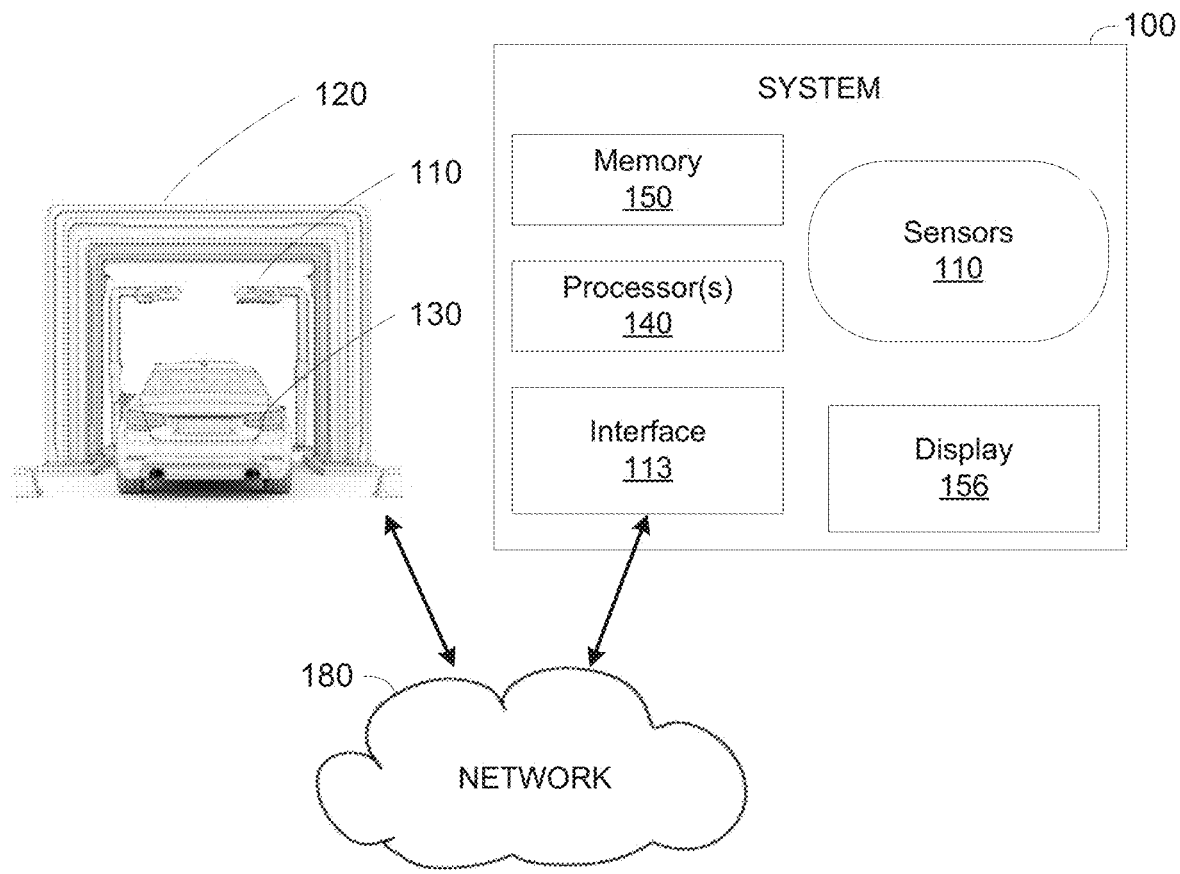
FIG. 1 is a schematic diagram illustrating the system architecture, showing the arrangement of multiple imaging devices around a inspection passage, along with the processor and memory components, according to some embodiments of the present invention.

In accordance with some embodiments of the invention, FIG. 1 illustrates a system 100 for generating an interactive vehicle inspection interface, also referred to herein as an interactive user interface or a user interface. The system 100 includes a set of multiple imaging devices 110 positioned on at least one side of a inspection passage 120 that a vehicle 130 passes through. The system 100 further includes at least one processor 140 and a memory 150 storing instructions that, when executed by the processor 140, perform various operations.

In accordance with some embodiments of the invention, the system 100 further comprises a network interface 113 configured to facilitate data communication between system components via at least one of: a local area network (LAN) and a wireless local area network (WLAN). The network interface 113 enables distributed processing capabilities wherein processing tasks allocated to the at least one processor 140 may be partitioned and distributed across multiple processing units. Additionally, the network interface 113 is configured to receive input data from supplementary sensing devices, as described in further detail below. The distributed architecture enabled by the network interface 113 provides enhanced processing capabilities and expanded data acquisition options while maintaining system cohesion through standardized network protocols.

Figure 2A:
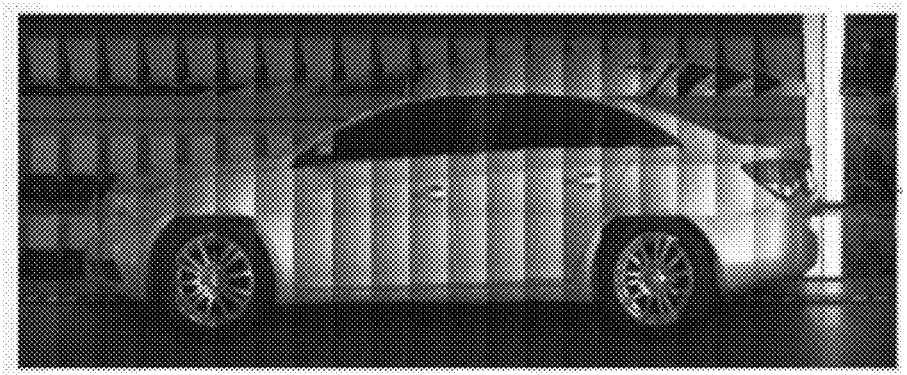
FIG. 2A is an exemplary composite image showing multiple sections of a vehicle captured at different time points during vehicle transition along the inspection path, according to some embodiments of the present invention.

The imaging devices 110 are configured to obtain a plurality of sets of multiple images of a plurality of segments of a surface of the vehicle 130. These sets of multiple images are captured at multiple time points during relative movement between the vehicle 130 and the imaging devices 110. The captured images are processed by processor using a stitching function to generate a dataset record mapping a plurality of vehicle parts and anomalies on the surface of the vehicle parts. For example, FIG. 2A is an exemplary image comprising multiple sections each captured at a different time point during a transition of the vehicle 130 along the path 120.

As used herein, "imaging devices" 110 may include, but are not limited to, high-resolution cameras, infrared cameras, 3D scanners, or any combination thereof. In one embodiment, the imaging devices 110 comprise a set of six digital cameras positioned at different heights and angles along the inspection passage 120 to capture comprehensive views of the vehicle surface. As used herein, 'inspection passage' refers to a dedicated physical space through which vehicles pass for inspection, typically configured as a controlled environment with predetermined dimensions and lighting conditions, equipped with multiple imaging devices positioned at specific locations. For example, the inspection passage 120 optionally is a dedicated space through which vehicles pass for inspection. For example, the passage 120 may be configured as a drive-through scanning tunnel with controlled lighting conditions, typically 20-30 feet in length and 12-15 feet in width to accommodate various vehicle sizes. As used herein, "processor" 140 may be implemented as one or more microprocessors, central processing units (CPUs), graphics processing units (GPUs), or application-specific integrated circuits (ASICs). The "memory" 150 may include random access memory (RAM), read-only memory (ROM), solid-state drives, or other suitable storage devices.

While the imaging devices provide comprehensive visual data capture, the processing system implements sophisticated analysis pipelines to transform this raw data into actionable insights through the following components and processes.

The imaging devices 110 may for example comprise high-resolution digital cameras with minimum specifications of 4K resolution (3840×2160 pixels) and capture rates of at least 30 frames per second. Each camera incorporates a 1-inch CMOS sensor with a dynamic range of at least 13 stops and implements global shutter technology to prevent motion artifacts during vehicle movement. The cameras may for example equipped with wide-angle lenses having focal lengths between 24 mm and 35 mm (35 mm equivalent) to ensure adequate coverage while minimizing distortion.

The arrangement of imaging devices 110 may for example follow a precise geometric configuration to ensure complete coverage of the vehicle surface. The primary configuration includes three cameras on each side of the inspection passage 120, positioned at heights of 0.5 meters, 1.2 meters, and 1.8 meters respectively. Each camera may for example be angled between 15 and 45 degrees relative to the perpendicular plane of the vehicle's path, with specific angles calculated to optimize coverage overlap between adjacent cameras. Additional cameras may be positioned at the entrance and exit of the passage to capture front and rear views.

For accurate damage detection and analysis, the system may require image resolution of 100 pixels per inch (or more) on the vehicle surface at the typical inspection distance. This translates to a minimum captured resolution of 0.25 mm per pixel at the vehicle surface, ensuring detection of surface anomalies as small as 1 mm in diameter. The imaging devices 110 may for example maintain this resolution across their entire field of view through appropriate lens selection and camera positioning.

The real-time visualization functionality may for example support parallel processing of at least 8 simultaneous threads and maintain a minimum processing speed of 2.5 GHz per core. The system may for example use a dedicated graphics processing unit (GPU) with minimum specifications of 8 GB VRAM and 2048 CUDA cores or equivalent, capable of handling real-time rendering of the vehicle visualization at 60 frames per second while maintaining marker synchronization.

The mapping record may for example implement a hierarchical data structure stored in JavaScript Object Notation (JSON) format, with separate sections for vehicle metadata, part segmentation, anomaly detection, and spatial relationships. Each anomaly entry in the mapping record may contain coordinates in both the original image space and the visualization space, along with severity classification, size measurements, and temporal tracking data. The structure may support real-time updates during visualization playback while maintaining referential integrity between different data components.

The marker synchronization may utilize a predictive tracking algorithm that maintains spatial consistency during vehicle rotation. The system may employ a multi-threaded synchronization pipeline comprising: (1) a position prediction thread that calculates expected marker positions at 60 Hz using a Kalman filter, (2) a validation thread that confirms marker positions against the mapping record at 30 Hz, and (3) a rendering thread that updates marker positions at 60 Hz to maintain smooth visualization. The system may maintain a temporal buffer of 120 frames to support smooth backward and forward playback while ensuring marker position accuracy.

A damage classification implementation described herein may process detected anomalies through one or more of the following stages:
(1) Detection using a convolutional neural network with minimum 92% accuracy for anomaly presence detection;
(2) Classification into predefined damage categories (scratches, dents, paint damage, etc.) using a ResNet-based architecture with minimum 85% accuracy per category;
(3) Severity assessment using a regression model that considers size, depth, and location to generate a numerical severity score between 0 and 100;
(4) Cost estimation based on severity score, damage type, and vehicle-specific repair data, with error margins not exceeding ±15% of actual repair costs.

The system may implement a marker positioning algorithm that performs one or more of the following:
(1) Maintains a graph-based spatial relationship model between anchor points and damage markers;
(2) Updates marker positions using quaternion-based rotation calculations; (3) Implements occlusion detection to properly hide/show markers based on current viewing angle;
(4) Maintains marker scale consistency across different viewing distances.

The anomaly tracking implementation described herein may utilize one or more of the following consistent damage visualization stages:
(1) Anomaly detection using deep learning models with minimum confidence threshold of 0.85;
(2) Spatial registration using closest anchor points with maximum allowed displacement of 5 mm;
(3) Temporal tracking using optical flow with forward-backward error checking; (4) Position refinement using local feature matching with RANSAC outlier rejection.

The processor also executes a first transformation function, implementing a first generative artificial intelligence (AI) model, to transform data from the multiple sets of images into a moving visual media object such as a video file. For example, the model may be a video generating model such as Sora™ with capabilities of creating photorealistic videos from the input or descriptions of the input, including high-fidelity vehicle visualizations. Other models may have diffusion-based architecture trained to generate spatially and temporally consistent video content maybe used. As used herein, 'moving visual media object' refers to a digital representation of a vehicle that enables dynamic visualization from multiple viewing angles, including but not limited to video files, interactive 3D models, or other formats that allow continuous viewing perspective changes. The moving visual media object depicts the vehicle 130 from multiple different points of view. The "stitching function" processes the captured images to create a unified "dataset record". For example, if the imaging devices 110 capture images of a vehicle's side panels, the stitching module 160 combines these images into a representation, optionally seamless representation, while optionally mapping identified damages (such as dents or scratches) and vehicle parts (such as doors or fenders). The "first generative AI model" may include neural networks trained on vehicle imagery to generate fluid visual representations.

For example, the first generative AI model implements:
a transformer architecture with 12 attention heads, 768-dimensional embeddings, and layer normalization after each attention block
training using AdamW optimizer with weight decay 0.01, learning rate 5e-5, and gradient clipping at 1.0
data preprocessing including image resizing to 1024×1024, normalization to [−1,1] range, and random augmentations
loss function combining perceptual loss using VGG features and adversarial loss with gradient penalty and/or
model deployment across distributed GPU clusters with tensor parallelism for layers 1-6 on GPU0 and 7-12 on GPU1

For instance, the model may convert multiple static images into a smooth visualization of the vehicle, optionally a 360-degree visualization of the vehicle. The "moving visual media object" 180 represents a dynamic visualization of the vehicle. For example, it may be a 360-degree interactive view where users can rotate and examine the vehicle from different angles, with frame rates typically between 24-30 frames per second for smooth visualization.

Figure 3:
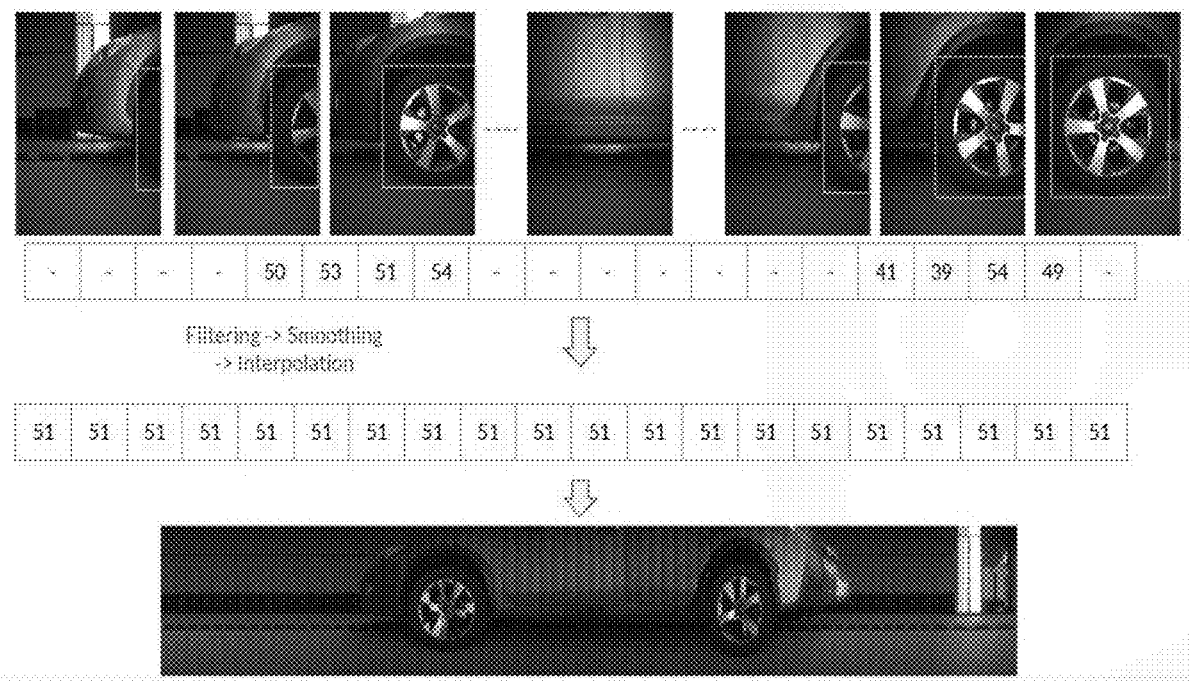
FIG. 3 is a sequential diagram demonstrating the tracking, filtering, smoothing, and interpolation process for frames 1-51 depicting an anchored part, specifically showing the front wheel tracking progression, according to some embodiments of the present invention.

In one or more optional embodiments of the invention, the processor 140 utilizes the tracked anchor parts 400 to perform alignment operations during the stitching of multiple camera views into the dataset record. The processor 140 executes alignment functions that reference the position record of the anchor parts to establish correspondence between images captured by different imaging devices 110. For example, FIG. 3 depicts how frames 1-51 depicting an anchored part, in this case the front wheel, are tracked filtered smoothed and interpolated to create a stitched image.

The processor 140 implements a camera view alignment function that processes the anchor part positions to compute spatial transformations between different camera perspectives. These transformations are stored in memory and enable accurate alignment of images captured from different viewing angles of the inspection passage 120.

During the stitching operation, the processor 140 applies the spatial transformations 510 to align the multiple camera views based on the corresponding positions of anchor parts 400. The processor 140 maintains a registration matrix in memory 150 that stores the mathematical relationships between different camera perspectives, using the tracked positions of wheels 410, door handles 420, headlights 430, and taillights 440 as reference points.

The processor 140 continuously updates the registration matrix as it processes each set of images, ensuring consistent alignment across the entire inspection sequence. This alignment process creates a coherent spatial framework within the dataset record, where all captured images are properly oriented and positioned relative to each other based on the fixed reference points provided by the anchor parts 400.

The aligned camera views are then incorporated into the dataset record, creating a spatially consistent representation of the vehicle 130 that maintains accurate positioning of all identified features and anomalies relative to the anchor parts 400. This aligned dataset serves as the foundation for subsequent visualization and analysis operations performed by the system.

In one or more optional embodiments of the invention, the processor 140 executes additional analysis functions stored in memory 150 to process the plurality of sets of multiple images captured by the imaging devices 110. The processor 140 implements a car parts segmentation model to analyze the captured images and generate car parts segmentations identifying distinct vehicle components within each frame.

The car parts segmentation model stored in memory 150 processes the image data to identify and delineate individual vehicle components such as doors, fenders, hood, and trunk within each captured frame. These segmentations serve as foundational data for subsequent tracking operations.

The car parts segmentation model may:
- be Modified DeepLab V3+architecture with MobileNet V3 backbone
- execute Atrous spatial pyramid pooling with rates [6, 12, 18]
- include auxiliary semantic edge detection branch
- trained on 100,000 annotated vehicle images
- be weighted cross-entropy loss with online hard example mining
- achieve 95% mean IoU on validation set with 30 fps inference.

The processor 140 performs temporal tracking operations on the generated car parts segmentations across the multiple frames of the moving visual media object. During temporal tracking, the processor 140 employs filtering algorithms to smooth the tracking data, reducing noise and inconsistencies in the segmentation data across frames. The filtering algorithms may process the segmentation data to maintain consistent identification of vehicle parts as the viewing angle changes.

The temporal tracking function executed by processor 140 creates associations between corresponding car parts across sequential frames, generating a temporal correlation map stored in memory 150. This correlation map enables the system to maintain consistent identification and tracking of vehicle components throughout the entire sequence of frames, even as the viewing perspective changes.

The processor 140 references this temporal tracking data when rendering the moving visual media object, ensuring that the segmented car parts maintain proper spatial and temporal relationships throughout the visualization sequence. This tracking information is also utilized by the processor 140 to maintain accurate positioning of the user-selectable markers, such as 165, relative to their associated vehicle parts across all frames. As used herein, 'user-selectable markers' refers to interactive visual indicators overlaid on the vehicle visualization that identify and correspond to specific anomalies, maintaining their spatial positioning during rotation or perspective changes and enabling user interaction for detailed information access.

Figure 2B:
FIG. 2B is a visualization frame showing a vehicle with multiple interactive markers indicating detected anomalies, according to some embodiments of the present invention.
Figure 2C:
FIG. 2C is a diagram illustrating identified anchor parts on a vehicle used for spatial reference and alignment, according to some embodiments of the present invention.

In one or more optional embodiments of the invention, the processor 140 executes instructions to identify and track specific anchor parts 400 on the vehicle 130, for example the anchor parts marked in FIG. 2C. The processor 140 utilizes the car parts segmentation model 300 to specifically identify fixed reference points that serve as anchor parts 400 across multiple frames of captured imagery.

The anchor parts 400 identified by the processor 140 include structural elements of the vehicle 130 that maintain consistent positioning and appearance across different viewing angles. These anchor parts 400 typically comprise wheels, door handles, headlights, and taillights. Each anchor part serves as a reliable reference point for spatial alignment and damage localization.

The processor 140 implements tracking algorithms to monitor the position and orientation of the identified anchor parts 400 across the sequence of frames in the moving visual media object. During tracking operations, the processor 140 maintains a position record stored in memory 150 that contains the coordinates and spatial relationships of each anchor part 400 throughout the visualization sequence.

The tracking function executed by the processor 140 continuously updates the position record as the viewing angle changes, maintaining accurate spatial relationships between the anchor parts 400. For each frame in the sequence, the processor 140 calculates and stores the precise location and orientation of each anchor part 400, creating a comprehensive spatial reference framework that supports various visualization and analysis functions.

The processor 140 utilizes this anchor part tracking data to ensure consistent spatial alignment across different viewing angles and to provide reliable reference points for mapping detected anomalies on the vehicle surface. The tracked anchor parts 400 serve as fundamental reference points that enable accurate registration of damage locations and consistent visualization of vehicle features throughout the inspection sequence.

Figure 4:
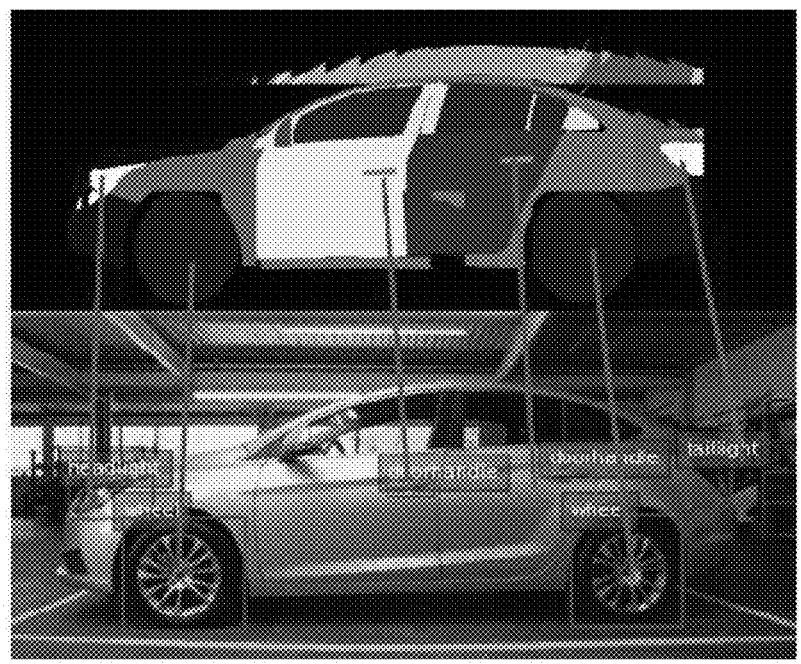
FIG. 4 is a mapping diagram showing the outcome of the mapping transformation function, illustrating how different vehicle segments are mapped to specific car parts in a target frame based on anchor associations, according to some embodiments of the present invention.

The processor also executes a mapping transformation function, computing a mapping record between the segmented parts of the vehicle and areas in at least one target frame from the moving visual media object using the dataset record. For example, FIG. 4 depicts and outcome of such mapping wherein each segment is mapped to different car parts in a target frame based on association to identified anchors. The "mapping function" creates a "mapping record" that correlates vehicle parts and damages between the original images and the generated visualization. For instance, when a dent is detected on the front fender in the original images, the mapping record tracks its position as the vehicle rotates in the visualization for example as described below. As used herein, 'mapping record' refers to a data structure that establishes and maintains spatial correlations between vehicle features identified in the original captured images and their corresponding locations in the visualization, enabling accurate tracking across different viewing angles.

The processor also executes a second transformation function, implementing a second generative AI model, to transform the mapping record and the moving visual media object into an interactive user interface. The interactive user interface depicts user-selectable markers that are synchronized with playback of the moving visual media object. These markers indicate locations of anomalies on the surface of the vehicle parts from different points of view. The interactive user interface includes a processing device that performs data retrieval and display actions based on user selection of one or more of the anomaly markers. As used herein, 'anomaly' refers to any detectable deviation, damage, defect, or irregularity on a vehicle's surface, including but not limited to dents, scratches, paint damage, rust, or other imperfections that differ from the vehicle's intended condition. The "second generative AI model" generates the interactive elements of the user interface. For example, it may create highlighting effects for damaged areas or generate smooth transitions between different viewing angles. For example FIG. 2B depicts a frame depicting a vehicle with multiple markers such as 165 thereon. The second generative AI model may implement:
- a U-Net architecture with skip connections and attention gates
- instance normalization and LeakyReLU activation functions
- multi-scale feature fusion at 4 different resolutions (512, 256, 128, 64)
- training on paired damaged/undamaged vehicle images using curriculum learning
- progressive growing of model capacity from 32 to 256 channels
- custom loss function balancing structural similarity and feature matching.

The "interactive user interface" displays the vehicle visualization with interactive elements. For example, it may include a main viewing area showing the rotating vehicle, side panels with detailed damage information, and navigation controls. The "user-selectable markers" are visual indicators of detected anomalies. For instance, a red dot might indicate a scratch, while a yellow triangle might indicate a dent. These markers remain synchronized with the vehicle's rotation and can be clicked to display detailed information.

In accordance with some embodiments of the invention, the generated interactive user interface is outputted for presentation to a user for instance on a local display 156 or on a remote display 156' executed on a client terminal. The processor 140 implements various output mechanisms to facilitate user access to the interface 200. In one implementation, the processor 140 executes instructions to render the interface directly on a display device connected to the system 100. Alternatively, the processor 140 may transmit interface instructions to a remote client device for local rendering and display. The processor 140 may implement different methods for delivering the interface instructions, including:
(1) forwarding complete rendering instructions to a client terminal for local execution;
(2) transmitting interface updates to a graphics engine for processing and display;
(3) generating incremental updates to modify an existing interface instance; (4) streaming pre-rendered interface content to a remote display device.

During output operations, the processor 140 optionally maintains synchronization between the interface components and their underlying data representations stored in memory 150. This ensures that all user-selectable markers, damage previews, and interactive elements remain properly coordinated regardless of the specific output mechanism employed.

The transmission of interface instructions optionally implements efficient data streaming protocols that minimize latency while maintaining visual quality. The processor 140 may optimize the delivery of interface content based on available network bandwidth, client device capabilities, and specific user requirements.

The interactive user interface generated by the described systems and methods enhances the efficiency and accuracy of reviewing machine-identified vehicle damages through several key mechanisms. The synchronized markers enable rapid validation of AI-detected anomalies by allowing inspectors to quickly navigate between damages while maintaining spatial context. Optional automatic rotation to optimal viewing angles may eliminate the time-consuming process of manually adjusting vehicle orientation for each damage assessment. Additionally, optional side-by-side presentation of overview and detailed damage views in the interface reduces cognitive load on reviewers by providing immediate access to high-resolution imagery and measurement data without losing context of the damage's location on the vehicle. These interface optimizations have been shown to reduce average damage review time by up to 60% while improving assessment consistency across different reviewers.

Processor(s) executing the user interface processes user interactions with the interface. For example, when a user clicks on a damage marker, the module may retrieve and display high-resolution close-up images of the damage, measurement data, and repair cost estimates.

The system 100 may integrate these components to create a comprehensive vehicle inspection visualization system that enables interactive exploration of detected vehicle anomalies through an AI-enhanced interface. The inspection passage 120 provides a controlled environment for consistent image capture while the vehicle 130 passes through, enabling the creation of detailed and accurate vehicle surface documentation.

In one or more optional embodiments of the invention, the processor 140 executes instructions from memory 150 to sequentially present multiple frames of the moving visual media object through the interactive user interface 200. The sequential presentation involves controlled timing and progression of frame displays, where each frame represents a different viewing position relative to the vehicle 130.

During execution, the processor 140 systematically progresses through different viewing angles stored in memory 150, presenting the vehicle 130 from various perspectives such as front, front quarter, side, rear quarter, and rear views. The progression typically follows pre-defined increments, such as 15-degree intervals, to maintain smooth visual transitions between frames.

The processor 140 may maintain frame synchronization between the displayed viewing angles and the corresponding position data stored in the mapping record 187. This synchronization ensures that the user-selectable markers 210 remain accurately positioned on the vehicle's surface throughout the rotation sequence. As the processor 140 advances through the frame sequence, it continuously updates the position and visibility of these markers to match the current viewing angle.

The memory 150 may store playback control parameters that the processor 140 uses to manage the sequential presentation. These parameters may include presentation speed, pause states, and directional controls. The processor 140 responds to user input received through the interactive user interface 200 to adjust these parameters, allowing users to control the progression of frames and examine specific angles of the vehicle 130 in detail.

During sequential presentation, the processor 140 continuously references the mapping record 187 to maintain spatial relationships between identified anomalies and vehicle parts, ensuring that all annotations and damage indicators remain correctly positioned regardless of the current viewing angle.

In one or more optional embodiments of the invention, the processor 140 executes additional functions that utilize the tracked anchor parts 400 for registering damage locations and synchronizing marker positions. The processor 140 implements a damage registration function that establishes spatial relationships between detected anomalies and the tracked anchor parts 400. As used herein, 'anchor parts' refers to fixed structural elements on a vehicle that maintain consistent positioning and appearance across different viewing angles, specifically including wheels, door handles, headlights, and taillights, which serve as reliable reference points for spatial alignment and damage localization.

The damage registration function may create and maintains a damage position record in memory 150 that stores the relative positions of detected anomalies with respect to the nearest anchor parts 400. The processor 140 may compute these relative positions using vector relationships between each damage location and its surrounding anchor parts 400, such as wheels, door handles, headlights, or taillights.

During playback of the moving visual media object, the processor 140 executes a marker synchronization function that continuously updates the positions of damage markers relative to the anchor parts 400. The marker synchronization function utilizes the damage position record and the current positions of anchor parts 400 to compute the correct placement of each damage marker in the current frame.

The processor 140 maintains a temporal synchronization map in memory 150 that tracks the relationships between damage markers and anchor parts 400 throughout the visualization sequence. This map enables the processor 140 to maintain consistent spatial relationships between damages and anchor parts as the viewing angle changes during playback.

The processor 140 uses these synchronized positions to update the user-selectable markers in the interactive user interface 200, ensuring that each damage indicator maintains its correct position relative to the anchor parts 400 regardless of the current viewing angle or playback position in the moving visual media object.

In one or more optional embodiments of the invention, the processor 140 executes specific transformation functions that convert the captured image data into a 360-degree walk-around video format. The processor 140 implements a video generation function that processes the multiple sets of images to create a comprehensive 360-degree visualization of the vehicle 130.

The processor 140 optionally utilizes the first generative AI model 175 to execute the video generation function, which creates a continuous video sequence stored in memory 150. This sequence provides a complete walk-around view of the vehicle 130, enabling visualization from any angle around the vehicle's circumference.

During video generation, the processor 140 optionally maintains a frame buffer in memory 150 that temporarily stores generated frames as they are processed. The frame buffer enables smooth transitions between different viewing angles while maintaining consistent visual quality throughout the generated sequence. The processor 140 implements frame interpolation functions to ensure smooth transitions between captured viewing angles, creating a fluid walking motion around the vehicle 130.

The processor 140 optionally generates metadata for each frame in the sequence, storing information about viewing angles, camera positions, and spatial relationships. This metadata is maintained in memory 150 and is used by the processor 140 to properly position and orient each frame within the complete 360-degree visualization.

The generated 360-degree walk-around video becomes part of the moving visual media object, providing a foundation for the interactive visualization capabilities of the system. The processor 140 continuously references the metadata during playback to maintain proper spatial orientation and ensure accurate presentation of the vehicle 130 from all viewing angles.

In one or more optional embodiments of the invention, the first generative AI model 175 incorporates multiple specialized components for generating the 360-degree visualization. The processor 140 implements a 3D reconstruction model that processes the captured images to create a three-dimensional representation of the vehicle 130.

Working in conjunction with the 3D reconstruction model, the processor 140 executes a rendering model that converts the reconstructed 3D data into viewable frames. The rendering model applies texture mapping, lighting calculations, and surface properties to create photorealistic representations of the vehicle 130 from any viewing angle.

The processor 140 may alternatively or additionally implement a neural radiance field (NeRF) model stored in memory 150. The NeRF model processes the captured images to create a neural representation of the vehicle's appearance, enabling novel view synthesis from previously unseen angles. The processor 140 maintains a radiance field data structure in memory 150 that stores the learned representations of the vehicle's appearance and geometry.

In another implementation, the processor 140 may utilize a Gaussian splatting model to generate the visualization. The Gaussian splatting model processes point cloud data derived from the captured images to create a continuous representation of the vehicle's surface. The processor 140 maintains a splat database in memory 150 that stores the Gaussian primitives used to reconstruct the vehicle's appearance.

The Gaussian splatting may include implementation features such as:
  Adaptive density control with 50K-200K Gaussians per vehicle
  Anisotropic 3D covariance optimization
  SH degree-3 color representation
  Progressive splitting and pruning during optimization
  Custom CUDA kernels for real-time rasterization
  Achieves 60 fps rendering with <5 GB memory usage.

These models can be used independently or in combination by the processor 140 to generate the moving visual media object. The processor 140 selects and applies the appropriate model or combination of models based on the quality of the captured images and the specific visualization requirements of the system.

In one or more optional embodiments of the invention, the interactive user interface includes multiple specialized viewing components, for example as interface 200 in FIG. 5. The processor 140 optionally generates and maintains a main multiple degrees view window 900 within the interface 200 that displays the moving visual media object, providing a primary visualization area such as a main view window 201 for allowing a user to examine the vehicle 130.

Adjacent to the main view window 201, the processor 140 implements a damage preview panel 910 that displays detailed information about detected anomalies. The damage preview panel 910 includes close-up image displays such as 912 showing high-resolution views of detected damages, optionally along with measurement data and condition descriptions stored in memory 150, for instance presented by clicking on the close-up image.

The processor 140 optionally generates a body part panel 920 within the interface 200 that provides interactive access to specific vehicle components. The body part panel 920 includes component selectors such as 922 that allow users to isolate and examine particular sections of the vehicle 130. When a component is selected, the processor 140 retrieves corresponding component data from memory 150 and updates the main view window 900 accordingly.

The interface 200 optionally includes an anchor point bar 930 generated by the processor 140 that facilitates navigation around the vehicle 130. The anchor point bar 930 contains predefined angle selectors such as 932 that, when activated, trigger the processor 140 to rotate the vehicle visualization to specific viewing angles. The processor 140 maintains an angle mapping table in memory 150 that correlates each selector with its corresponding viewing angle.

The processor 140 coordinates these interface components to maintain synchronized visualization states, ensuring that selections in one panel appropriately update the displays in other panels and the main view window 900.

In one or more optional embodiments of the invention, the interactive user interface 200 includes specialized damage visualization features. The processor 140 generates and maintains damage markers 1000 that are overlaid on the vehicle representation within the main multiple degrees view window 900.

The processor 140 implements a marker rendering function that creates visual indicators at positions corresponding to detected anomalies on the vehicle surface. These damage markers such as 1000 are stored in a marker database within memory 150, which maintains the spatial coordinates and visual properties of each marker.

During playback of the moving visual media object, the processor 140 executes a marker synchronization function that continuously updates the position and orientation of each damage marker 1000. The synchronization function references a rotation matrix stored in memory 150 to calculate the correct position of each marker as the vehicle visualization rotates.

The processor 140 maintains spatial correlation data that maps the relationship between each damage marker and its corresponding location on the vehicle surface. This correlation data enables the processor 140 to maintain accurate marker positioning regardless of the current viewing angle or rotation state of the vehicle visualization.

As the vehicle representation rotates within the interface 200, the processor 140 continuously updates the visibility and position of each damage marker 1000, ensuring that the markers maintain proper spatial relationships with their corresponding damage locations on the vehicle surface. The processor 140 also manages marker occlusion, determining when markers should be hidden or displayed based on the current viewing angle and vehicle orientation.

In one or more optional embodiments of the invention, the interactive user interface 200 includes rotation control functionality for enhanced damage visualization. The processor 140 executes a rotation control function that manages the vehicle's orientation within the interface to provide optimal viewing angles for examining specific damages. As used herein, 'optimal viewing angle' refers to a specific perspective or position relative to a vehicle or anomaly that provides the clearest and most comprehensive view for inspection or analysis purposes, as determined by the system's analysis of the spatial characteristics of the feature being viewed.

Upon user selection of a damage marker 1000, for example by clicking on elected marker, the processor 140 activates an optimal angle calculation function that determines the best viewing position for the selected damage. The processor 140 maintains an optimal angle database in memory 150 that stores predetermined optimal viewing angles for different regions of the vehicle 130.

The processor 140 implements a rotation transition function that smoothly adjusts the vehicle's orientation to the calculated optimal angle. During this transition, the processor 140 maintains a rotation state record in memory 150 that tracks the current rotation angle and progress of the transition animation.

The rotation control function interfaces with the marker synchronization function to ensure that all damage markers 1000 maintain proper positioning throughout the rotation transition. The processor 140 continuously updates the position and orientation of damage markers 1000 based on the current rotation state, referencing the spatial correlation data to maintain accurate spatial relationships.

During the rotation transition, the processor 140 manages view update timing 1150 to ensure smooth animation while maintaining visual clarity of the selected damage area. The rotation control functionality enables users to efficiently examine specific damages from their most revealing angles while maintaining overall context within the vehicle visualization.

In one or more optional embodiments of the invention, the processor 140 executes specialized mapping functions to establish spatial relationships between the dataset record and the moving visual media object. The processor 140 implements a coordinate registration function that aligns the coordinate system of the dataset record with the coordinate system used in the visual media object.

The processor 140 maintains a coordinate transformation matrix in memory 150 that stores the mathematical relationships between the two coordinate systems. This matrix enables the processor 140 to accurately translate positions between the original dataset space and the visualization space.

During the registration process, the processor 140 executes a mapping computation function that creates positional correlations between the anomalies identified in the dataset record and their corresponding locations in the frames of the moving visual media object. The processor 140 stores these correlations in a spatial mapping database within memory 150.

The processor 140 utilizes reference point matching to establish consistent spatial relationships between the dataset record and the visualization frames. These reference points enable the processor 140 to maintain accurate positioning of anomalies even as the viewing angle changes during visualization playback.

The mapping computation function generates and maintains a frame correlation index that tracks how each anomaly's position in the dataset record corresponds to its location in each frame of the moving visual media object. This enables consistent and accurate visualization of anomalies throughout the entire inspection sequence.

In one or more optional embodiments of the invention, the generated interactive user interface includes specialized visualization components that enable comprehensive inspection of the vehicle 130. For example, as depicted in FIG. 5, the processor 140 implements a continuous rotation function to present the vehicle in different angles within a main multiple degrees view window that automatically rotates the vehicle visualization optionally at a predetermined speed. This rotation may be paused by user input through the interface 200, allowing manual adjustment of the viewing angle through scroll inputs or anchor point selection.

Reference is now also made to FIG. 6. The processor 140 may execute a code for generating a damage marker overlay that displays damage indicators as circular markers such as 1312 on the vehicle surface. These markers are managed to ensure synchronization with the vehicle's rotation, maintaining accurate spatial positioning throughout the visualization sequence. The marker tracking references the damage position record to update marker positions in real-time as the viewing angle changes.

The processor 140 optionally implements a hover interaction function that enhances the visualization of damage locations. When a user's cursor hovers over a damage marker 1312, the processor 140 activates a connection rendering function that generates a visual connecting line such as 1412 between the marker and its corresponding preview in the damage preview panel 910. The connection rendering function 1410 maintains a connection state record in memory 150 that tracks active connections and their visual properties.

In one or more optional embodiments of the invention, the damage preview panel 910 includes enhanced interaction capabilities. The processor 140 implements a preview hover system that responds to user cursor interaction with damage previews displayed in the panel. When a user hovers over a preview image such as 912, the processor 140 executes an optimal angle transition function that automatically rotates the vehicle visualization to the most advantageous viewing angle for the selected damage.

The processor 140 optionally maintains an optimal angle database in memory 150 that stores predetermined optimal viewing angles for each documented damage location. During preview hover interactions, the processor 140 retrieves the corresponding optimal angle data and triggers a smooth transition of the vehicle visualization to that position. Concurrently, the connection rendering function generates the visual connecting line 1412 between the preview and its corresponding damage marker 1312 on the vehicle surface.

In one or more optional embodiments of the invention, the execution of the interactive user interface 200 includes a specialized body part inspection function. The processor 140 implements a body part selection interface that provides access to specific vehicle components that may be outside the scope of the main 360-degree visualization, such as tires, treads, roof elements, and interior components. The body part selection interface maintains a component registry in memory 150 that maps available inspection areas to their corresponding detailed views and data.

When a user interacts with the body part selection interface, the processor 140 activates a component highlighting function 1630 that generates a visual connection between the selected component option and its relevant location on the vehicle visualization. The processor 140 implements a modal display that, upon user selection of a body part, presents a dedicated inspection view containing detailed imagery and analysis of the selected area.

In one or more optional embodiments of the invention, the processor 140 implements a navigation anchor that facilitates precise viewing angle control. The system includes an anchor point bar interface positioned below the main visualization area, presenting a series of clickable navigation points that correspond to predefined viewing angles around the vehicle. The processor 140 maintains an anchor point mapping table in memory 150 that correlates each navigation point with its specific viewing angle and rotation parameters.

When a user interacts with a navigation point, either through hovering or clicking, the processor 140 executes a rotation control function that adjusts the vehicle visualization to the corresponding perspective. During this interaction, the processor 140 disables the automatic rotation function to maintain a stable view at the selected angle. The rotation control function implements smooth transition animations between viewing angles, managed by a transition control module that ensures fluid visual updates while maintaining spatial coherence of all damage markers and overlays.

In alternative embodiments of the invention, the imaging devices 110 may implement different capture configurations. Instead of fixed-position cameras, the system may utilize robotic arms equipped with movable cameras that dynamically adjust their position and angle during vehicle inspection. The robotic arms may follow predetermined paths or implement adaptive positioning based on real-time analysis of captured images. Additionally, the system may employ drone-mounted cameras that autonomously navigate around the vehicle to capture comprehensive imagery from multiple heights and angles.

In another alternative embodiment, the first generative AI model 175 may implement a hybrid approach combining multiple visualization techniques. The system may simultaneously generate both a neural radiance field (NeRF) representation and a Gaussian splatting model, using each technique's strengths for different visualization aspects. The NeRF model may handle fine surface detail and texture representation, while the Gaussian splatting provides efficient real-time rendering of the overall vehicle structure. The system may dynamically switch between these representations based on viewing distance, required detail level, or available computational resources.

Alternative embodiments may implement different approaches to damage detection and classification. Instead of using a single convolutional neural network, the system may employ an ensemble of specialized models, each trained to detect specific types of damage. For example, separate models may focus on paint damage, dent detection, scratch analysis, and structural deformation. The system may implement a voting mechanism where multiple models contribute to the final damage assessment, potentially improving accuracy and robustness.

The interactive user interface 200 may implement alternative visualization approaches in some embodiments. Instead of a single main view window, the interface may provide multiple synchronized views showing different angles simultaneously. The system may implement a split-screen interface where users can compare different sections of the vehicle side-by-side or overlay multiple time points to track changes in vehicle condition. The interface may also support virtual reality (VR) or augmented reality (AR) implementations where users can examine the vehicle in an immersive 3D environment.

Alternative embodiments may implement different approaches to data storage and processing. Instead of processing all image data in real-time, the system may implement a hybrid approach where basic analysis is performed immediately while more detailed processing occurs asynchronously. The system may maintain a hierarchical storage system where frequently accessed data remains in fast memory while detailed historical data is archived in lower-cost storage. Additionally, the system may implement distributed processing across multiple nodes, with different nodes specializing in specific tasks such as image processing, damage detection, or interface generation.

In some alternative embodiments, the system may implement different methods for temporal synchronization and marker tracking. Instead of using fixed anchor points, the system may implement a dynamic anchor system that identifies and tracks multiple reference points based on local feature density and visibility. The system may use probabilistic tracking methods that maintain multiple hypotheses for feature correspondence across frames, potentially improving robustness to occlusion and lighting changes. Additionally, the system may implement predictive tracking that anticipates marker positions based on learned patterns of vehicle movement and camera positioning.

Alternative embodiments may implement different approaches to user interaction and control. The system may support gesture-based controls where users can manipulate the vehicle visualization through hand movements captured by depth sensors. Voice commands may be implemented to control rotation, zoom, and marker selection. The system may also support multi-user collaboration where multiple users can simultaneously interact with the visualization from different devices while maintaining synchronized views and consistent marker positioning.

In accordance with some embodiments of the invention, FIG. 7 illustrates a flowchart of a method 2000 for generating an interactive user interface for vehicle inspection visualization. The method 2000 is implemented using the system 100 described above with reference to FIG. 1, utilizing the multiple imaging devices 110, processor 140, and memory 150.

The method 2000 begins with an image acquisition phase 2100, where the processor 140 obtains multiple sets of images from the imaging devices 110. The imaging devices 110, positioned along the inspection passage 120, capture multiple images of vehicle surface segments at different time points during the relative movement between the vehicle 130 and imaging devices 110. The image acquisition phase 2100 ensures comprehensive coverage of the vehicle surface through synchronized capture operations.

Following image acquisition, the method 2000 proceeds to a stitching operation 2200, where the processor 140 executes instructions to stitch the multiple sets of images into a dataset record. The stitching operation 2200 processes the captured images to create a unified mapping of vehicle parts and detected surface anomalies. During this phase, the processor 140 maintains spatial relationships between different image segments while building a coherent representation of the vehicle surface.

The method 2000 then enters a first transformation phase 2300, where the processor 140 utilizes the first generative AI model 175 to transform the image data into a moving visual media object. This transformation phase 2300 processes the stitched image data to create a dynamic visualization that presents the vehicle from multiple viewing angles. The first generative AI model 175 ensures smooth transitions between different perspectives while maintaining visual consistency.

In a mapping computation phase 2400, the processor 140 executes instructions to compute a mapping record between the segmented vehicle parts and areas within one or more target frames of the moving visual media object. The mapping computation phase 2400 establishes spatial correlations that enable accurate tracking of vehicle features across different viewing angles. The processor 140 maintains these correlations in the mapping record 187 stored in memory 150.

The method 2000 proceeds with a second transformation phase 2500, where the processor 140 employs the second generative AI model to transform the mapping record and moving visual media object into an interactive user interface. During this phase, the processor 140 generates user-selectable markers that remain synchronized with the media playback, indicating anomaly locations from multiple viewing angles. The second transformation phase 2500 ensures that the resulting interface supports dynamic user interaction while maintaining spatial accuracy of all displayed elements.

Optionally, the resulting UI is outputted, for example forwarded for presenting to a user on a client device. Instructions for presenting the resulting UI maybe provided in various ways, for example executed for rendering the UI on a display at a client terminal, forwarded for execution by a graphical engine and/or used to update an existing UI.

As shown at 2600, the interactive user interface performs data retrieval and/or display actions based on one or more user selections of one or more of the plurality of markers (anomalies). In accordance with some embodiments of the invention, as shown at 2700, the processor 140 controls presentation of the moving visual media object through the interactive user interface 200 in response to user interaction with the plurality of user-selectable markers. This may be done by implementing a multi-stage response system comprising: (1) marker selection detection, (2) view optimization calculation, and (3) synchronized visual updates.

Upon detection of a user action indicating selection of one or more user-selectable markers, a series of coordinated operations may be performed. The processor 140 may validate the selected marker's spatial correlation data in the mapping record 187 to ensure accurate correspondence between the marker position and the underlying anomaly location. Following validation, the processor 140 calculates the optimal viewing angle for the selected anomaly based on factors including surface orientation, lighting conditions, and relative position within the vehicle structure.

Optionally, temporal synchronization between marker selection events and the corresponding visual media playback state is maintained. When a marker is selected, the processor 140 executes a transition sequence that smoothly adjusts the visualization to present the optimal view while maintaining spatial coherence of all markers. The transition sequence implements interpolation algorithms that ensure fluid movement between viewing angles while preserving accurate positioning of all interface elements. The processor 140 may coordinate these operations with the damage preview panel 910, triggering simultaneous updates to display detailed inspection data corresponding to the selected anomaly. The validation procedures maintain a state record of active selections, enabling consistent visualization behavior during subsequent user interactions and ensuring proper restoration of previous views when selections are deactivated.

Throughout the execution of method 2000, the processor 140 optionally maintains temporal synchronization between different components of the system 100. The method 2000 may implement continuous error checking and validation procedures to ensure data integrity across all processing phases. These procedures verify the accuracy of spatial relationships, marker positioning, and user interaction responses throughout the interface generation process.

The processor 140 optionally maintains optimization procedures that run concurrently with the main method steps. These optimization procedures optionally monitor system performance and adjust processing parameters to maintain efficient operation while ensuring high-quality output. The optimization procedures may include memory management, processing load balancing, and real-time performance tuning.

The GUI's approach to data presentation directly addresses traditional bottlenecks in the damage review process. By maintaining consistent spatial relationships between damage markers during vehicle rotation, reviewers can quickly verify the accuracy of AI-detected damages without the confusion often encountered when switching between static images. The optional interface's preview panel may provide instant access to detailed damage information through hoverable markers, eliminating the need to manually cross-reference separate damage reports or documentation. This streamlined access to damage data, combined with the interface's intuitive navigation controls and automatic view optimization, may reduce the cognitive effort required to validate AI findings. The result is a more efficient review process that improves both the speed and accuracy of damage assessments while reducing reviewer fatigue.

In accordance with some embodiments of the invention, the system's practical application is demonstrated through several illustrative use cases that highlight the efficiency improvements enabled by the interactive interface:

Exemplary USE CASE A: Multi-Point Damage Assessment Workflow

A vehicle inspector utilizes the system to review AI-detected damages across multiple vehicle surfaces. The inspector initiates the workflow by accessing the main multiple degrees view window 900, which presents the complete vehicle visualization. Upon noticing clustered damage markers 1000 on the vehicle's front quarter panel, the inspector hovers over the first marker, triggering the system to:

(1) automatically rotate the vehicle to the optimal viewing angle for the selected damage;

2) generate a connecting line 1412 between the marker and its corresponding high-resolution preview in the damage preview panel 910;

(3) display detailed damage measurements and severity classifications.

The inspector may validate the assessment by comparing the high-resolution preview against the contextualized vehicle view, then proceeds to the next marker through a single hover interaction. This streamlined workflow eliminates traditional inefficiencies of switching between separate images or documentation, enabling rapid sequential validation of multiple damage points while maintaining spatial awareness of their relative positions on the vehicle.

Exemplary USE CASE B: Collaborative Remote Inspection Review

A senior assessor remotely reviews damage assessments performed by field inspectors using the system's interface 200. The assessor accesses a vehicle inspection record and utilizes the anchor point bar 930 to systematically review each vehicle section. Upon identifying a damage marker 1312 requiring clarification:

(1) the assessor clicks the marker, optionally automatically triggering optimal angle positioning;

(2) utilizes the damage preview panel 910 to examine high-resolution imagery;

(3) references the body part panel 920 to verify the precise component identification;

(4) documents their findings through the interface's annotation capabilities.

The interface optionally maintains consistent spatial registration between all damage markers and their corresponding locations, enabling clear communication about specific damages without confusion or ambiguity. This streamlined remote review process maintains assessment accuracy while eliminating the need for time-consuming in-person reinspection or lengthy written clarifications about damage locations.

Exemplary USE CASE C: Fleet Condition Monitoring

A fleet manager employs the system to track vehicle condition changes over time. The interface enables efficient comparison of current inspection results against baseline conditions by:

(1) providing synchronized access to historical and current damage markers;

(2) Exemplary enabling rapid navigation between different vehicle areas through the anchor point bar 930;

(3) facilitating immediate access to detailed damage documentation through the preview panel 910;

(4) maintaining consistent spatial registration of damage locations across multiple inspections.

This implementation enables fleet managers to quickly identify new damages or condition changes while maintaining comprehensive documentation of vehicle status over time. The interface's intuitive navigation and organization of inspection data significantly reduces the time required for condition monitoring while improving the accuracy of change detection.

It is expected that during the life of a patent maturing from this application many relevant hardware units will be developed and the scope of the term camera, image sensor, processor and network is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for generating a user interface, comprising:
a set of multiple imaging devices positioned on at least one side of an inspection passage that a vehicle passes through;
at least one processor; and
a memory storing instructions that, when executed by the at least one processor, cause the system to:
obtain, from the set of multiple imaging devices, a plurality of sets of multiple images of a plurality of segments of a surface of the vehicle, the plurality of sets of multiple images are captured at a plurality of time points during a relative movement between the vehicle and the set of multiple imaging devices;

stitch from the plurality of sets of multiple images a dataset record mapping a plurality of vehicle parts and a plurality of anomalies on a surface of one or more of the plurality of vehicle parts;

transform data from the plurality of sets of multiple images to a moving visual media object depicting the vehicle from a plurality of different points of view using a first generative artificial intelligence (AI) model;

compute a mapping record between the plurality of segmented parts of the vehicle and areas in at least one target frame from the moving visual media object using the dataset record;

transform the mapping record and the moving visual media object to an interactive user interface depicting a plurality of user-selectable markers synchronized with a playback of the moving visual media object, indicating locations of the plurality of anomalies on the surface of the one or more vehicle parts from a group of the plurality of different points of view using a second generative AI model;

wherein the interactive user interface performs a data retrieval and display action based on one or more user selection of one or more of the plurality of anomalies.

2. The system of claim 1, wherein the instructions, when executed by the at least one processor, further cause the system to: sequentially present multiple frames of the moving visual media object visual to present using the interactive user interface to a user a plurality of different points of view in relation to the depicted vehicle.

3. The system of claim 2, wherein the instructions, when executed by the at least one processor, further cause the system to: analyze the plurality of sets of multiple images using a car parts segmentation model to generate car parts segmentations; perform temporal tracking of the car parts segmentations across the multiple frames of the moving visual media object.

4. The system of claim 2, wherein the instructions, when executed by the at least one processor, further cause the system to:

identify anchor parts on the vehicle using a car parts segmentation model;
track the identified anchor parts across the multiple frames;
wherein the anchor parts comprise fixed reference points including one or more of: wheels, door handles, headlights, and taillights.

5. The system of claim 4, wherein the instructions, when executed by the at least one processor, further cause the system to: use the tracked anchor parts to align multiple camera views during the stitching of the dataset record.

6. The system of claim 4, wherein the instructions, when executed by the at least one processor, further cause the system to: use the tracked anchor parts to register damage locations relative to the anchor parts; and synchronize damage marker positions during a playback of the moving visual media object.

7. The system of claim 1, wherein the interactive user interface comprises: a main multiple degrees view displaying the moving visual media object; a damage preview panel displaying close-up images and detailed information about detected anomalies; a body part panel providing access to specific vehicle components; an anchor point bar providing navigation to predefined angles around the vehicle.

8. The system of claim 1, wherein the interactive user interface is configured to: display damage markers overlaid on the vehicle that rotate in sync with the vehicle's movement.

9. The system of claim 1, wherein the second generative AI model implements:
an attention mechanism to:
focus on relevant vehicle regions during rotation;
predict optimal marker placement;
maintain visual consistency of interface elements; and
adapt visualization parameters based on user interaction patterns.

10. The system of claim 1, wherein the instructions to compute the mapping record, when executed by the at least one processor, cause the system to:
register the dataset record to a coordinate system of a visual representation;
map a plurality of features from the dataset record to corresponding locations in frames of the visual representation.

11. The system of claim 1, wherein the instructions, when executed by the at least one processor, further cause the system to:
implement an automated motion function that modifies the visual representation according to predetermined parameters;
maintain a feature overlay system that synchronizes visual indicators with the motion;
execute a visual connection function that generates graphical links between related interface elements in response to user interaction events;
wherein the visual connection function maintains a real-time state record tracking active connections during the motion.

12. The system of claim 11, wherein the instructions, when executed by the at least one processor, further cause the system to:
automatically trigger motion to predetermined optimal viewpoints stored in a viewpoint database;
execute real-time spatial transformations to maintain visual indicator positioning during motion transitions; and
synchronize the visual connection function with the motion transitions to maintain graphical links between interface elements.

13. The system of claim 1, wherein the instructions, when executed by the at least one processor, further cause the system to:
maintain a feature registry mapping inspection areas to corresponding detailed views;
implement a display system that dynamically generates dedicated inspection views for selected features;
execute real-time highlighting functions creating visual connections between selected elements and their locations in the visual representation;
wherein the highlighting functions maintain spatial accuracy during motion and view transitions.

14. The system of claim 1, wherein the instructions, when executed by the at least one processor, further cause the system to:
implement a navigation system comprising a series of predefined viewpoints;
maintain a navigation mapping table correlating navigation elements with specific motion parameters;
execute a motion control function that:
modifies automated motion based on user selection;

performs smooth transition animations between viewpoints while maintaining spatial coherence of visual indicators;

updates indicator positions and visual connections in real-time during transitions;

wherein the motion control function references the mapping record to ensure accurate spatial relationships throughout the transition.

15. The system of claim 1, wherein the second generative AI model comprises:

a neural network trained to:

generate user interface elements synchronized with vehicle rotation;

predict optimal marker positions across different viewing angles;

maintain temporal consistency of marker positioning during transitions; and wherein the neural network utilizes anchor part tracking data to validate marker positioning accuracy.

16. The system of claim 1, wherein the system further implements real-time synchronization by:

maintaining a temporal buffer of marker positions;

predicting marker trajectories during rotation transitions;

interpolating between known positions for smooth animation;

validating marker positions against the mapped anomaly locations; and adjusting marker visibility based on current viewing angle.

17. The system of claim 1, wherein the instructions further cause the system to:

implement a damage severity classification model that:

analyzes detected anomalies using multi-scale feature extraction;

assigns severity scores based on size, depth, and location;

generates repair cost estimates; and updates marker visualization based on severity classification.

18. The system of claim 1, wherein the first generative AI model implements:

a multi-stage pipeline comprising:

an initial reconstruction stage generating a coarse 3D model;

a refinement stage enhancing geometric detail;

a texture synthesis stage maintaining visual consistency; and a view-dependent rendering stage optimizing output for current perspective.

19. The system of claim 1, wherein the system implements marker synchronization by:

maintaining a spatial graph structure linking:

anchor parts positions;

detected anomaly locations;

marker rendering parameters; and updating the graph in real-time during visualization playback.

20. A method of generating an interactive vehicle inspection interface, comprising:

obtaining, from a set of multiple imaging devices positioned on at least one side of a stationary inspection passage that a vehicle passes through, a plurality of sets of multiple images of a plurality of segments of a surface of the vehicle, the plurality of sets of multiple images are captured at a plurality of time points during a relative movement between the vehicle and the set of multiple imaging devices;

stitching from the plurality of sets of multiple images a dataset record mapping a plurality of vehicle parts and a plurality of anomalies on a surface of one or more of the plurality of vehicle parts;

transforming data from the plurality of sets of multiple images to a moving visual media object depicting the vehicle from a plurality of different points of view using a first generative artificial intelligence (AI) model;

computing a mapping record between the plurality of segmented parts of the vehicle and areas in at least one target frame from the moving visual media object using the dataset record;

transforming the mapping record and the moving visual media object to an interactive user interface depicting a plurality of user-selectable markers synchronized with a playback of the moving visual media object, indicating locations of the plurality of anomalies on the surface of the one or more vehicle parts from a group of the plurality of different points of view using a second generative AI model;

controlling a presentation of the moving visual media object by the interactive user interface in response to a user action indicative of a selection of one or more of the plurality of user-selectable markers by a user;

wherein the interactive user interface performs a data retrieval and display action based on one or more user selection of one or more of the plurality of anomalies.

* * * * *